(12) United States Patent
Cvijetic et al.

(10) Patent No.: US 10,534,092 B2
(45) Date of Patent: Jan. 14, 2020

(54) TECHNOLOGIES FOR VEHICLE POSITIONING

(71) Applicant: Tesla, Inc., Palo Alto, CA (US)

(72) Inventors: Neda Cvijetic, East Palo Alto, CA (US); Robert Cofield, Mountain View, CA (US); Mark McClelland, San Francisco, CA (US); Zeljko Popovic, San Francisco, CA (US); Francis Havlak, Redwood City, CA (US)

(73) Assignee: Tesla, Inc., Palo Alto, CA (US)

( * ) Notice: Subject to any disclaimer, the term of this patent is extended or adjusted under 35 U.S.C. 154(b) by 288 days.

(21) Appl. No.: 15/610,785

(22) Filed: Jun. 1, 2017

(65) Prior Publication Data

US 2018/0364366 A1    Dec. 20, 2018

(51) Int. Cl.
| | |
|---|---|
| *G01S 19/51* | (2010.01) |
| *G01S 19/47* | (2010.01) |
| *H04W 4/02* | (2018.01) |
| *H04W 64/00* | (2009.01) |
| *G01C 21/00* | (2006.01) |
| *H04W 4/40* | (2018.01) |

(52) U.S. Cl.
CPC ............. *G01S 19/51* (2013.01); *G01S 19/47* (2013.01); *H04W 4/027* (2013.01); *H04W 64/00* (2013.01); *H04W 4/40* (2018.02)

(58) Field of Classification Search
CPC ......... G01S 19/51; G01S 19/47; H04W 4/027
See application file for complete search history.

(56) References Cited

U.S. PATENT DOCUMENTS

| 9,020,755 B1 | 4/2015 | Gazit et al. | |
|---|---|---|---|
| 2011/0285586 A1 | 11/2011 | Ferguson | |
| 2013/0311086 A1* | 11/2013 | Aoki | ...................... G01C 21/30 |
| | | | 701/446 |
| 2016/0291164 A1 | 10/2016 | Jordan | |
| 2018/0190125 A1* | 7/2018 | Hayee | .................... G08G 1/167 |

FOREIGN PATENT DOCUMENTS

DE    10-2013-001120 A1    7/2014

OTHER PUBLICATIONS

PCT International Search Report and the Written Opinion from the corresponding PCT/US2018/026210 dated Jun. 21, 2018.

* cited by examiner

*Primary Examiner* — Adam M Alharbi
(74) *Attorney, Agent, or Firm* — Knobbe, Martens, Olson & Bear, LLP

(57) ABSTRACT

Various vehicle technologies for improving positioning accuracy despite various factors that affect signals from navigation satellites. Such positioning accuracy is increased via determining an offset and communicating the offset in various ways or via sharing of raw positioning data between a plurality of devices, where at least one knows its location sufficiently accurately, for use in differential algorithms.

8 Claims, 7 Drawing Sheets

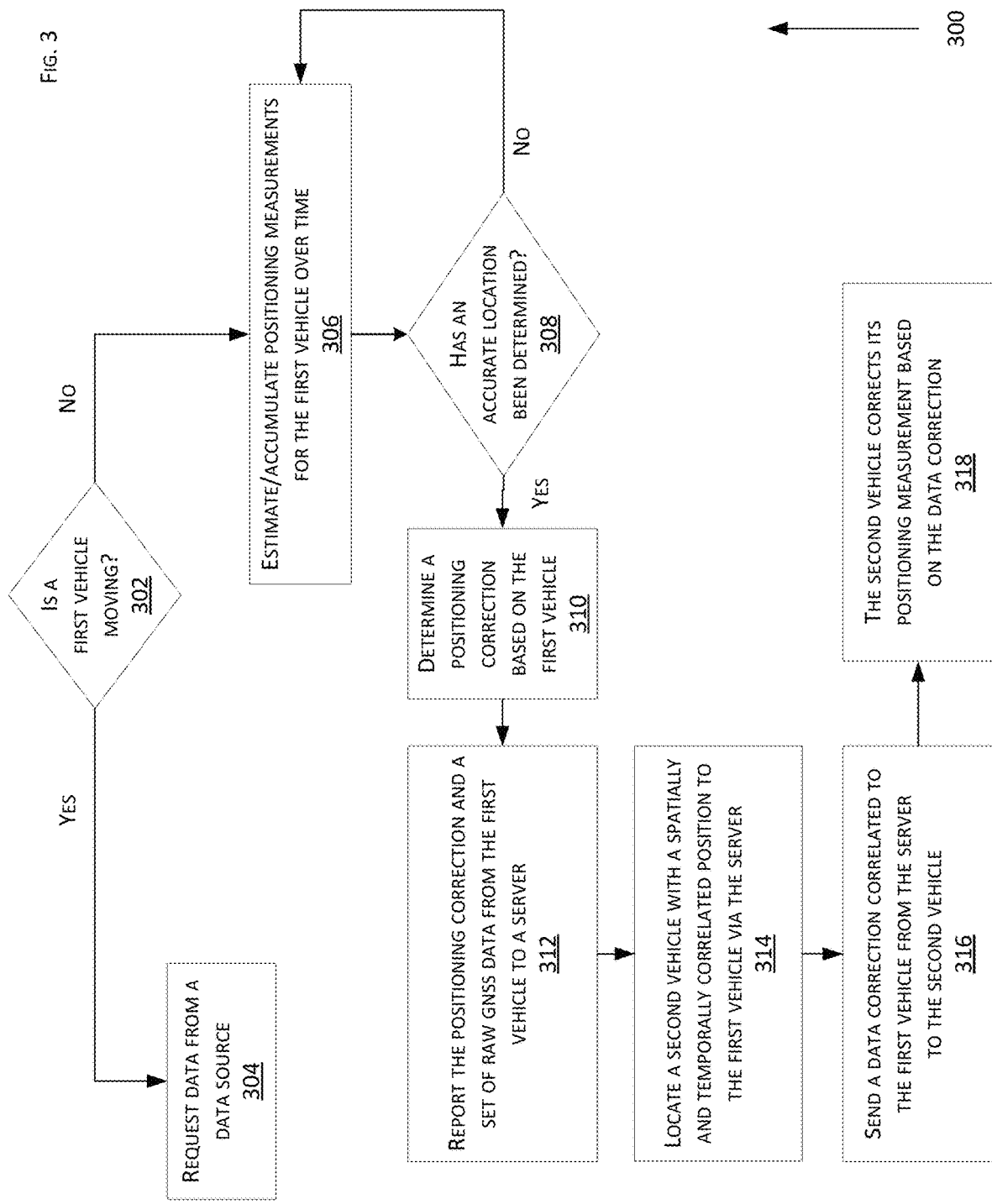

TECHNOLOGIES FOR VEHICLE POSITIONING

TECHNICAL FIELD

This disclosure generally relates to vehicle positioning (also known as localization), and more specifically relates to methods and systems for improving accuracy in position assessment.

BACKGROUND

A plurality of navigation satellites broadcast a plurality of signals to a positioning receiver such that the positioning receiver is able to determine a position thereof, with a certain accuracy, based on the signals. Some factors, such as satellite geometry, signal blockage, ionospheric perturbation, atmospheric conditions, or others, affect the signals such that that the accuracy of determining the position of the receiver is reduced. For example, a smartphone with a positioning receiver may be able to determine its position to within five meters of the smartphone. The accuracy of the position determination may worsen when the receiver is in proximity of buildings, bridges, trees, or other structures. Although this may be sufficient for some positioning applications, greater accuracy is desirable for other applications, including autonomous driving. Accordingly, there is a desire to provide greater positioning accuracy despite the factors that affect the signals from the navigation satellites.

SUMMARY

This disclosure discloses one or more inventions that improve positioning accuracy despite the factors that affect the signals from the navigation satellites. The inventions increase such positioning accuracy via determining and applying offsets (corrections) in various ways, or via sharing of raw positioning data between a plurality of devices, where at least one knows its location sufficiently accurately, for use in differential algorithms. For example, some of such techniques can include (a) a reference station sharing a positional offset with an automobile, (b) a reference station calculating and sharing a set of parameters (offsets/corrections) for various error components including atmospheric, orbital, and clock, and/or (c) a reference station sharing its raw GNSS data so that vehicles can remove errors through differencing, or other calculations. For example, the offset can be a positioning offset, i.e., an actual offset, a correction offset per satellite or per a plurality of satellites, a vehicular offset generated via a vehicle processing raw data when the vehicle is not in signal communication with a base station, or others.

An embodiment includes a method for extending a range of a reference station, the method comprising: receiving, via a hardware server, a set of correction data from a first vehicular client positioned within a signal applicability range of a reference station; and sending, via the hardware server, the set of correction data to a second vehicular client positioned outside the signal applicability range of the reference station.

An embodiment includes a system for extending a range of a reference station, the system comprising: a hardware server configured to: receive a set of correction data from a first vehicular client positioned within a signal applicability range of a reference station; and send the set of correction data to a second vehicular client positioned outside the signal applicability range of the reference station.

An embodiment includes an apparatus for extending a range of a reference station, the apparatus comprising a vehicle including a processor and a memory, wherein the processor is in communication with the memory and the memory stores a set of instructions that when executed via the processor cause the processor to: receive a first set of data from a reference station; generate a second set of data based on the first set of data; and send the second set of data to a server.

An embodiment includes a method for using a vehicle as a reference station, the method comprising: receiving, via a hardware server, a set of correction data from a first vehicular client as the first vehicular client is stationary such that the first vehicular client operates as the reference station; locating, via the hardware server, a second vehicular client with respect to the first vehicular client based on a first value and a second value, the first value corresponding to the second vehicular client being in spatial proximity to first vehicular client and the second value corresponds to the second vehicular client being in temporal proximity to the first vehicular client; and sending, via the hardware server, the set of correction data to the second vehicular client such that the second vehicular client is able to correct a positioning measurement thereof based on the set of correction data.

An embodiment includes a system for using a vehicle as a reference station, the system comprising: a hardware server configured to: receive a set of correction data from a first vehicular client as the first vehicular client is stationary such that the first vehicular client operates as the reference station; locate a second vehicular client with respect to the first vehicular client based on a first value and a second value, the first value corresponding to the second vehicular client being in spatial proximity to first vehicular client, the second value corresponding to the second vehicular client being in temporal proximity to the first vehicular client; and send the set of correction data to the second vehicular client such that the second vehicular client is able to correct a positioning measurement thereof based on the set of correction data.

An embodiment includes an apparatus for using a vehicle as a reference station, the apparatus comprising a vehicle including a processor and a memory, wherein the processor is in communication with the memory and the memory stores a threshold and a set of instructions that when executed via the processor cause the processor to: generate a plurality of positioning measurements over a period of time as the vehicle is stationary such that the vehicle operates as the reference station; determine whether the positioning measurements satisfy the threshold; generate a set of correction data based on the positioning measurements; and send the set of correction data to a server.

An embodiment includes a method for using a set of vehicles as a stationary cooperative reference station, the method comprising: receiving, via a hardware server, a first raw positioning measurement from a first vehicular client as the first vehicular client is stationary; receiving, via the hardware server, a second raw positioning measurement from a second vehicular client as the second vehicular client is stationary; performing, via the hardware server, an optimization process based on the first raw positioning measurement and the second raw positioning measurement; generating, via the hardware server, a positioning correction based on the optimization process; and sending, via the hardware server, the correction to a third vehicular client as the third vehicular client is moving.

An embodiment includes a system for using a set of vehicles as a stationary cooperative reference station, the system comprising: a hardware server configured to: receive a first raw positioning measurement from a first vehicular client as the first vehicular client is stationary; receive a second raw positioning measurement from a second vehicular client as the second vehicular client is stationary; perform an optimization process based on the first raw positioning measurement and the second raw positioning measurement; generate a positioning correction based on the optimization process; and send the correction to a third vehicular client as the third vehicular client is moving.

An embodiment includes an apparatus for using a set of vehicles as a stationary cooperative reference station, the apparatus comprising: a vehicle including a processor and a memory, wherein the processor is in communication with the memory, wherein the memory stores a threshold and a set of instructions that when executed via the processor cause the processor to: generate a plurality of first positioning measurements over a period of time as the vehicle is stationary; determine whether the first positioning measurements satisfy the threshold, generate a plurality of second positioning measurements based on the first positioning measurements, wherein the second positioning measurements are raw; and send the second positioning measurements to a server.

An embodiment includes a method for using a set of vehicles as a stationary cooperative reference station, the method comprising: receiving, via a hardware server, a raw positioning measurement from a first vehicular client as the first vehicular client is stationary; performing, via the hardware server, an atmospheric modeling process based on the raw positioning measurement; generating, via the hardware server, an output from the atmospheric modeling process; and sending, via the hardware server, the output to a second vehicular client as the second vehicular client is moving.

An embodiment includes a system for using a set of vehicles as a stationary cooperative reference station, the system comprising: a hardware server configured to: receive a raw positioning measurement from a first vehicular client as the first vehicular client is stationary; perform an atmospheric modeling process based on the raw positioning measurement; generate an output from the atmospheric modeling process; and send the output to a second vehicular client as the second vehicular client is moving.

An embodiment includes a method for using a set of vehicles as a set of moving reference stations for map-relative localization, the method comprising: receiving, via a hardware server, a map pose and a raw positioning measurement from a first vehicular client that is moving and vision-localized to a map; and sending, via the hardware server, the map pose and the raw positioning measurement to a second vehicular client such that (a) the second vehicular client determines a first position vector relative to the first vehicular client based on the map pose and the raw positioning measurement, (b) the second vehicular client receives a second position vector relative to a third vehicular client from the third vehicular client, and (c) the second vehicular client updates a second map pose based on the first position vector and the second position vector, wherein the second map pose is of the second vehicular client.

An embodiment includes a system for using a set of vehicles as a set of moving reference stations for map-relative localization, the system comprising: a hardware server configured to: receive a map pose and a raw positioning measurement from a first vehicular client that is moving and vision-localized to a map; and send the map pose and the raw positioning measurement to a second vehicular client such that (a) the second vehicular client determines a first position vector relative to the first vehicular client based on the map pose and the raw positioning measurement, (b) the second vehicular client receives a second position vector relative to a third vehicular client from the third vehicular client, and (c) the second vehicular client updates a second map pose based on the first position vector and the second position vector, wherein the second map pose is of the second vehicular client.

An embodiment includes an apparatus for using a set of vehicles as a set of moving reference stations for map-relative localization, the apparatus comprising: a vehicle including a processor and a memory, wherein the processor is in communication with the memory and the memory stores a set of instructions that when executed via the processor cause the processor to: vision-localize the vehicle to a map; generate a pose based on the map; generate a raw positioning measurement; and send the pose and the raw positioning measurement to a server.

An embodiment includes an apparatus for using a vehicle as a reference station, the apparatus comprising: a vehicle including a processor, a memory, and a sensor, wherein the processor is in communication with the memory and the sensor, wherein the memory stores a set of instructions that when executed via the processor cause the processor to: receive an input from the sensor; confirm a map-referenced position of the vehicle based on the input; receive a positioning signal; generate an offset based on the map-referenced position and the positioning signal; and send the offset.

These and other embodiments or aspects of this disclosure are discussed in greater detail below with reference to the accompanying drawings.

BRIEF DESCRIPTION OF DRAWINGS

FIG. 3 shows a flowchart of an embodiment of a method for using a vehicle as a reference station according to this disclosure.

DETAILED DESCRIPTION

Generally, this disclosure discloses a technology for improving positioning accuracy despite the factors (such as satellite geometry, signal blockage, ionospheric perturbation, atmospheric conditions, or others) that can affect the signals from the navigation satellites. The inventions increase such positioning accuracy via determining an offset and communicating the offset in various ways, or via sharing of raw positioning data between a plurality of devices, where at least one knows its location sufficiently accurately, for use in differential algorithms. For example, some of such techniques can include (a) a reference station calculating and sharing a set of parameters for various error components including atmospheric, orbital, and clock, or (b) a reference station sharing its raw GNSS data so that vehicles can remove errors through differencing, or others. For example, the offset can be a positioning offset, i.e., an actual offset, a correction offset per satellite or per a plurality of satellites, a vehicular offset generated via a vehicle processing raw data when the vehicle is not in signal communication with a base station, or others. Note that a set of raw positioning data can include an alphanumeric value corresponding to at least one of a longitude, a latitude, an altitude, a differential positioning technique measurements, such as a carrier phase of an electromagnetic wave emanating from a positioning satellite, as measured by a transceiver, a Doppler shift of an electromagnetic carrier wave emanating from a positioning satellite, as experienced by a transceiver, a pseudo range measurement describing a distance between an antenna and a positioning satellite, a ratio of a carrier wave power to an electromagnetic noise power experienced by a transceiver, or others, as known to skilled artisans.

Figure 1:
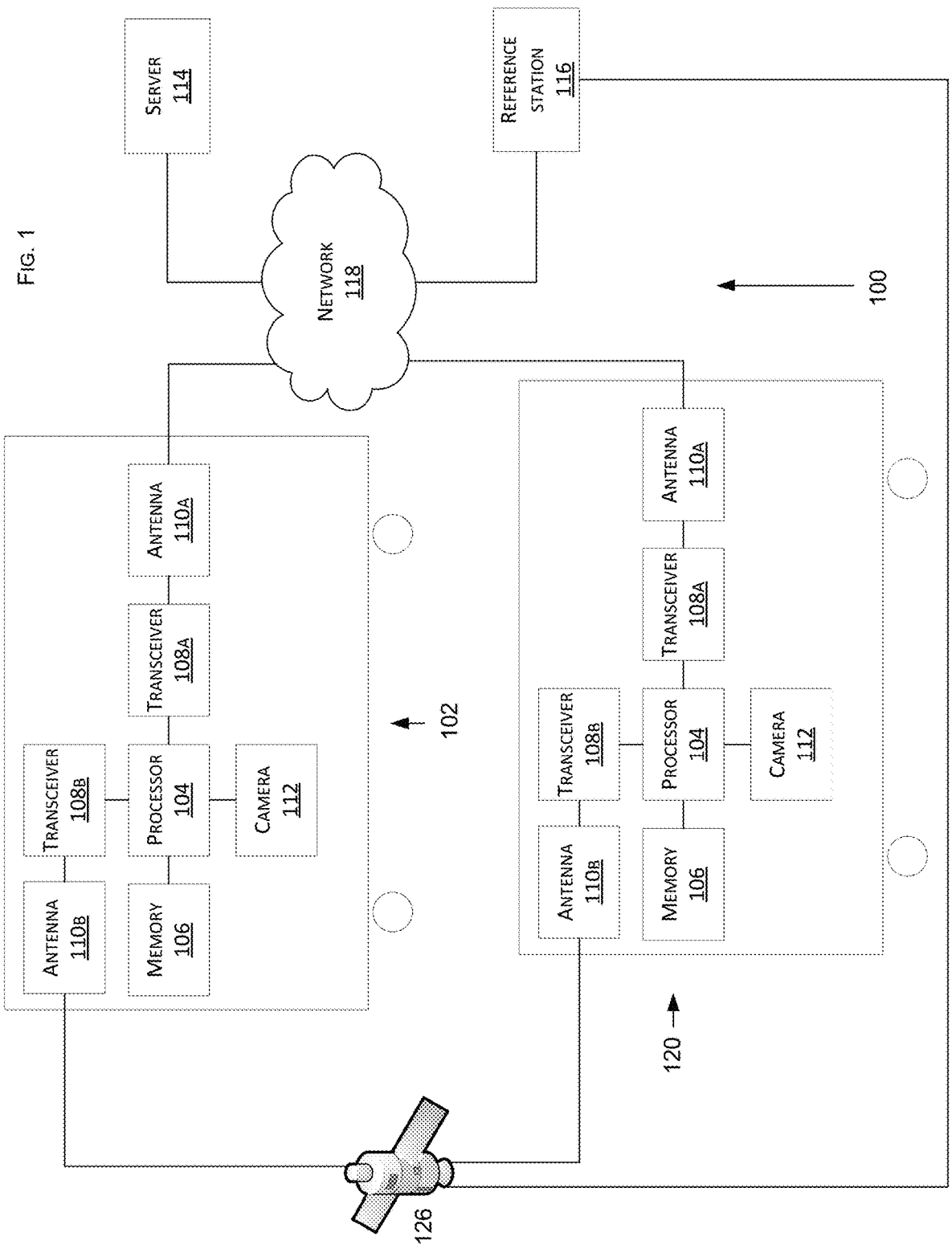
FIG. 1 shows a schematic diagram of an embodiment of a vehicle according to this disclosure.

FIG. 1 shows a schematic diagram of an embodiment of a vehicle according to this disclosure. A system 100 includes a vehicle 102, a vehicle 120, a satellite 126, a network 118, a server 114, and a reference station 116.

The network 118 can include a plurality of nodes, such as a collection of computers or other hardware interconnected via a plurality of communication channels, which allow for sharing of resources or information. Such interconnection can be direct or indirect. The network 118 can be wired, waveguide, or wireless. The network 118 can allow for communication over short or long distances, whether encrypted or unencrypted. The network 118 can operate via at least one network protocol, such as Ethernet, a Transmission Control Protocol (TCP)/Internet Protocol (IP), or others. The network 118 can have any scale, such as a personal area network (PAN), a local area network (LAN), a home area network, a storage area network (SAN), a campus area network, a backbone network, a metropolitan area network, a wide area network (WAN), an enterprise private network, a virtual private network, a virtual network, a satellite network, a computer cloud network, an internetwork, a cellular network, or others. The network 118 can be or include an intranet or an extranet. The network 118 can be or include Internet. The network 118 can include other networks or allow for communication with other networks, whether sub-networks or distinct networks, whether identical or different from the network 118 in structure or operation. The network 118 can include hardware, such as a computer, a network interface card, a repeater, a hub, a bridge, a switch, an extender, an antenna, or a firewall, whether hardware based or software based. The network 118 can be operated, directly or indirectly, by or on behalf of one or more entities or actors, irrespective of any relation to contents of this disclosure. In some embodiments, although the network 118 between the vehicle 102, the vehicle 120, and the server 114 can be wired, the network 118 can use different type of wireless technologies, such as WiFi, cellular, V2X, or others.

The satellite 126 is a component of a global navigation satellite system (GNSS) that uses a plurality of satellites, such as at least two satellites, such as four or more satellites, to provide autonomous geo-spatial positioning. Some examples of such system include a Global Positioning System (GPS), a Global Navigation Satellite System (GLONASS), a Galileo system, or others.

Each of the vehicle 102 and the vehicle 120 can be a land vehicle, whether manned or unmanned, whether non-autonomous, semi-autonomous, or fully autonomous, such as a car/automobile, a sports utility vehicle (SUV), a van, a minivan, a limousine, a bus, a truck, a trailer, a tank, a tractor, a motorcycle, a bicycle, a heavy equipment vehicle, or others. For example, at least one of the vehicle 102 or the vehicle 120 can be a Tesla Corporation Model S (or any other Tesla Corporation model) equipped with Tesla Autopilot (enhanced Autopilot) driver assist functionality and having a Hardware 2 component set (November 2016).

Each of the vehicle 102 and the vehicle 120 includes a chassis, a power source, a drive source, a set of wheels, a processor 104, a memory 106, a transceiver 108a, a transceiver 108b, an antenna 110a, an antenna 110b, and a camera 112.

The chassis securely hosts the power source, the drive source, and the set of wheels. The power source includes a battery, which is rechargeable. The drive source includes an electric motor, whether brushed or brushless. However, an internal combustion engine is possible, in which case the power source includes a fuel tank hosted via the chassis and coupled to the internal combustion engine. The power source is coupled to the drive source such that the drive source is powered thereby. The set of wheels includes at least one wheel, which may include an inflatable tire, which may include a run-flat tire. The set of wheels is driven via the drive source.

The processor 104 is a hardware processor, such as a single core or a multicore processor. For example, the processor 104 comprises a central processing unit (CPU), which can comprise a plurality of cores for parallel/concurrent independent processing. In some embodiments, the processor 104 includes a graphics processing unit (GPU). The processor 104 is powered via the power source and is coupled to the chassis. In some embodiments, the processor 104 can include a tensor processing unit (TPU), which may include an application-specific-integrated circuit (ASIC).

The memory 106 is in communication with the processor 104, such as in any known wired, wireless, or waveguide manner. The memory 106 comprises a computer-readable storage medium, which can be non-transitory. The storage medium stores a plurality of computer-readable instructions for execution via the processor 104. The instructions instruct the processor 104 to facilitate performance of a method for improving positioning accuracy via determining an offset and communicating the offset in various ways, as disclosed herein. For example, the instructions can include an operating system of the vehicle or an application to run on the operating system of the vehicle. For example, the processor 104 and the memory 106 can enable various file or data input/output operations, whether synchronous or asynchronous, including any of the following: reading, writing, editing, modifying, deleting, updating, searching, selecting, merging, sorting, encrypting, de-duplicating, or others. The memory 106 can comprise at least one of a volatile memory unit, such as random access memory (RAM) unit, or a non-volatile memory unit, such as an electrically addressed memory unit or a mechanically addressed memory unit. For example, the electrically addressed memory can comprise a flash memory unit. For example, the mechanically addressed memory unit can comprise a hard disk drive. The memory 106 can comprise a storage medium, such as at least one of a data repository, a data mart, or a data store. For example, the storage medium can comprise a database, including distributed, such as a relational database, a non-relational database, an in-memory database, or other suitable databases, which can store data and allow access to such data via a storage controller, whether directly and/or indirectly, whether in a raw state, a formatted state, an organized stated, or any other accessible state. The memory 106 can comprise any type of storage, such as a primary storage, a secondary storage, a tertiary storage, an off-line storage, a volatile storage, a non-volatile storage, a semiconductor storage, a magnetic storage, an optical storage, a flash storage, a hard disk drive storage, a floppy disk drive, a magnetic tape, or other suitable data storage medium. The memory 106 is powered via the power source and is coupled to the chassis.

Each of the transceivers 108a and 108b is in communication with the processor 104, such as in any known wired, wireless, or waveguide manner. Each of the transceivers 108a and 108b includes a transmitter and a receiver. The transmitter and the receiver are operably interconnected and may be housed in a single housing, although distribution among a plurality of housings in any combinatory manner is possible. Although each of the transceivers 108a and 108b is configured for electromagnetic energy, such as radio, other configurations are possible, such as for use with optical energy, such as light, sound energy, such as sound, or any other form of energy. Each of the transceivers 108a and 108b is powered via the power source and is coupled to the chassis. In some embodiments, the vehicle 102 and the vehicle 120 can communicate with each other, such as via the transceivers 108a, whether directly or indirectly. For example, such communication can be over a vehicle-to-vehicle (V2V) network.

Each of the transceivers 108a is in communication with an antenna 110a. Each of the transceivers 108b is in communication with an antenna 110b. Each of the antenna 110a and the antenna 110b may be an omnidirectional or directional antenna. Note that the transceiver 108a and the antenna 110a are functionally different from the transceiver 110b and the antenna 110b, respectively. In particular, the transceiver 110b and the antenna 110b are configured for receiving positioning signals and data from GNSS systems, such as the satellite(s) 126, whereas the transceiver 108a and the antenna 110a are configured for communicating data over networks other than the GNSS systems, such as terrestrial networks, such as cellular networks, Wi-Fi networks, V2V networks, or others, and thereby use frequencies, modulation and encoding techniques, and protocols different from each other. For example, at least one of the antenna 110a or the antenna 110b can be an monopole antenna, a dipole antenna, an array antenna, a loop antenna, an aperture antenna, a traveling wave antenna, or others. The transceiver 108a is in communication with the network 118 via the antenna 110a, such as via a cellular or Wi-Fi connection. The transceiver 108b is in communication with the satellite 126 via the antenna 110b, such as via a GPS unit. In some embodiments, the transceiver 108b can house the antenna 110b, as a unit.

The camera 112 is in communication with the processor 104, such as in any known wired, wireless, or waveguide manner. The camera 112 can include a plurality of cameras 112. The camera 112 includes an image capture device or optical instrument for capturing or recording images, which may be stored locally, whether temporarily or permanently, transmitted to another location, or both. The camera 112 may capture images to enable the processor 104 to perform various image processing techniques, such as compression, image and video analysis, telemetry, or others. For example, image and video analysis can comprise object recognition, object tracking, any known computer vision or machine vision analytics, or other analysis. For example, the camera 112 can detect a geometry of a boundary of a lane, as known to skilled artisans, on which the vehicle 102 or the vehicle 120 is travelling. This functionality has a beneficial utility because such detection can be used in a vision-map matching localization approach, as disclosed herein, where a location estimate is varied until the location estimate makes a camera-reported lane boundary coincide with a map-reported lane boundaries. The images may be individual still photographs or sequences of images constituting videos. The camera 112 can comprise an image sensor, such as a semiconductor charge-coupled device (CCD) or an active pixel sensor in a complementary metal-oxide-semiconductor (CMOS) or an N-type metal-oxide-semiconductor (NMOS), and a lens, such a rectilinear lens, a concave lens, a convex lens, a wide-angle lens, a fish-eye lens, or any other lens. The camera 112 can be analog or digital. The camera 112 can comprise any focal length, such as wide angle or standard. The camera 112 can comprise a flash illumination output device. The camera 112 can comprise an infrared illumination output device. The camera 112 is powered via the power source and coupled to the chassis.

The server 114 includes a computer apparatus containing a processor, a memory, and a networking unit. The processor can include a hardware processor, such as a single core or a multicore processor. For example, the processor comprises a CPU, which can comprise a plurality of cores for parallel/concurrent independent processing. In some embodiments, the processor includes a GPU. For example, the server 114 can include a network server.

The memory is in communication with the processor, such as in any known wired, wireless, or waveguide manner. The memory comprises a computer-readable storage medium, which can be non-transitory. The storage medium stores a plurality of computer-readable instructions for execution via the processor. The instructions instruct the processor to facilitate performance of a method for improving positioning accuracy via determining and applying corrections in various ways or via sharing of raw positioning data between a plurality of devices, where at least one knows its location sufficiently accurately, for use in differential algorithms, as disclosed herein. For example, the processor and the memory can enable various file or data input/output operations, whether synchronous or asynchronous, including any of the following: reading, writing, editing, modifying, deleting, updating, searching, selecting, merging, sorting, encrypting, de-duplicating, or others. The memory can comprise at least one of a volatile memory unit, such as random access memory (RAM) unit, or a non-volatile memory unit, such as an electrically addressed memory unit or a mechanically addressed memory unit. For example, the electrically addressed memory can comprise a flash memory unit. For example, the mechanically addressed memory unit can comprise a hard disk drive. The memory can comprise a storage medium, such as at least one of a data repository, a data mart, or a data store. For example, the storage medium can comprise a database, including distributed, such as a relational database, a non-relational database, an in-memory database, or other suitable databases, which can store data and allow access to such data via a storage controller, whether directly and/or indirectly, whether in a raw state, a formatted state, an organized stated, or any other accessible state. The memory can comprise any type of storage, such as a primary storage, a secondary storage, a tertiary storage, an off-line storage, a volatile storage, a non-volatile storage, a semiconductor storage, a magnetic storage, an optical storage, a flash storage, a hard disk drive storage, a floppy disk drive, a magnetic tape, or other suitable data storage medium. As such, via the processor and the memory, the server 114 runs an operating system, such as MacOS, Windows, or others, and an application on the operating system.

The networking unit comprises a network interface controller for network communication with the network 118, whether wired, waveguide, or wireless. For example, the networking unit comprises a hardware unit for computer networking communication based on at least one standard selected from a set of Institute of Electrical and Electronics Engineers (IEEE) 802 standards, such as an IEEE 802.11 standard. For instance, the networking unit comprises a wireless network card operative according to a IEEE 802.11 (g) standard. The networking unit is in communication with the processor, such as in any known wired, wireless, or waveguide manner.

The reference station 116 is ground-based, mounted at a known geolocation point assigned to the reference station 116, and is stationary. For example, the reference station can include a power source, a processor, a memory, a plurality of transceivers, a plurality of antennas, a camera, or other input or output devices, as powered via the power source and controlled via the processor, as disclosed herein. In some embodiments, the reference station 116 is virtual, sea-based, air-based, or mobile, such as relative Real Time Kinematic (RTK). The reference station 116 is in communication with the network 118, whether in a wired, waveguide, or wireless manner. The reference station 116 is also in wireless or waveguide communication with the satellite 126 and thereby enables differential correction. For example, the reference station 116 is mounted at a known geolocation point and continually collects GNSS data from the satellite 126. The satellite 126 may inform the reference station 116 that the reference station 116 is at a different location than where the reference station 116 knows the reference station 116 actually is. If reference station 116 knows that the reference station 116 is at the known geolocation, but the satellite 126 is informing the reference station 116 that the reference station 116 is a certain distance away from the known geolocation, then the reference station 116 can determine that at that time of day, in that known geolocation, there is an offset or error corresponding to the certain distance in the GNSS data from the satellite 126. As such, the reference station 116 can communicate that offset or error to any rover devices receiving data from the reference station 116. However, note that other techniques, whether additionally or alternatively, are possible. For example, some of such techniques can include various approaches where (1) the reference station 116 calculates and shares a set of parameters for various error components, including atmospheric, orbital, and clock, or (2) the reference station 116 shares its raw positioning data, such as GNSS data, such as GPS data, with the vehicle 102 or the vehicle 120 so that the vehicle 102 or the vehicle 120 can remove errors through differencing.

In some embodiments, at least one of the vehicle 102 or the vehicle 120 can include an ultrasonic sensor in communication with the processor 104, powered via the power source, and coupled to the chassis. The ultrasonic sensor is a transducer which converts an electrical signal to an ultrasound wave for output, such as via a transmitter or a transceiver, and which converts a reflected ultrasound wave into an electrical signal for input, such as via a receiver or a transceiver. The ultrasonic sensor evaluates an attribute of a target via interpreting a sound echo from the sound wave reflected from the target. Such interpretation may include measuring a time interval between sending the sound wave and receiving the echo to determine a distance to the target. The ultrasonic sensor is preferably powered via the power source and coupled to the chassis. The ultrasonic sensor can be used in detecting an objects in the proximity of at least one of the vehicle 102 or the vehicle 120.

In some embodiments, at least one of the vehicle 102 or the vehicle 120 can include a radar in communication with the processor 104, powered via the power source, and coupled to the chassis. The radar includes a transmitter producing an electromagnetic wave such as in a radio or microwave spectrum, a transmitting antenna, a receiving antenna, a receiver, and a processor (which may be the same as the processor 104) to determine a property of a target. The same antenna may be used for transmitting and receiving as is common in this art. The transmitter antenna radiates a radio wave (pulsed or continuous) from the transmitter to reflect off the target and return to the receiver via the receiving antenna, giving information to the processor about the target's location, speed, angle, and other characteristics. The processor may be programmed to apply digital signal processing (DSP), machine learning and other relevant techniques, such as via using code stored in the memory 106, that are capable of extracting useful information from various noise levels. In some embodiments, the radar includes a lidar, which employs ultraviolet, visible, or near infrared light from lasers in addition to, or as an alternative to, the radio wave. The lidar can be used in detecting objects in the proximity of at least one of the vehicle 102 or the vehicle 120.

In one mode of operation, the vehicle 102 is positioned within a signal applicability range of the reference station 116, such as within thirty miles, and receives a first set of data from the reference station 116, where the reference station 116 generates the first set of data based on the reference station 116 communicating with the satellite 126. Note that this is appropriate in a situation where as a separation between a reference data user and a reference station location increases, an applicability of error estimates decreases due to a difference in respective conditions. The vehicle 102 generates a second set of data based on the first set of data and sends the second set of data to the server 114. Also note that that the vehicle 102, by being sufficiently close to the reference station 116, is able to calculate its position sufficiently accurately, and then when the vehicle 102 generates the second set of data, that second set of data benefits from this accuracy, and thus when the vehicle 120 receives that second set of data, the vehicle 120 also benefits by being able to use that second set of data to calculate its own position more accurately. The server 114 receives the second set of data from the vehicle 102 and sends the second set of data to the vehicle 120, which is positioned outside the signal applicability range of the reference station 116.

Figure 2A:
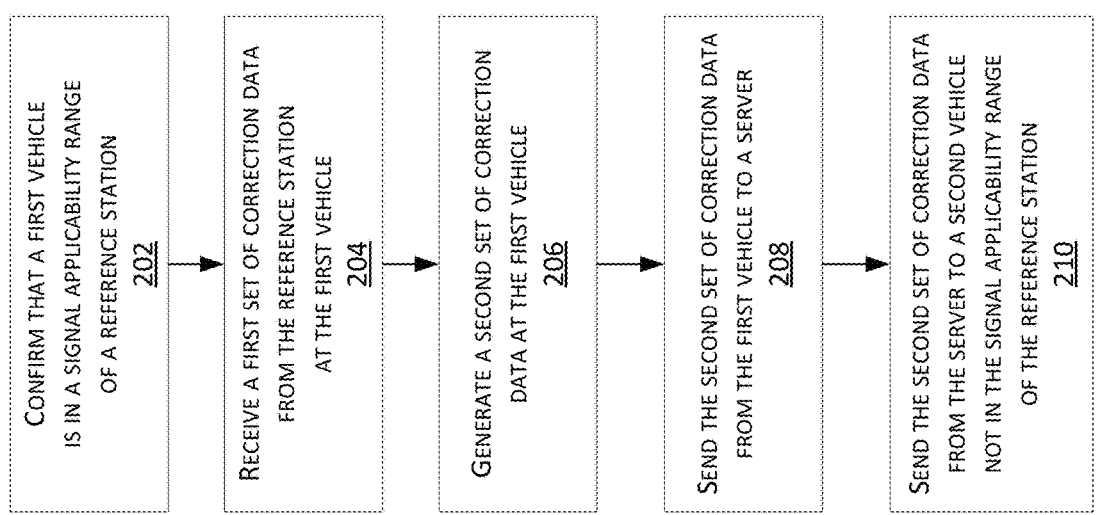
FIG. 2a shows a flowchart of an embodiment of a method for extending a range of a reference station according to this disclosure.

FIG. 2a shows a flowchart of an embodiment of a method for extending a range of a reference station according to this disclosure. A method 200a includes a plurality of blocks 202-210, which are performed via the system 100.

In the block 202, a first vehicle, such as the vehicle 102, confirms, such as via the processor 104, that the first vehicle is in a signal range, such as within fifty miles, of a reference station, such as the reference station 116. Such confirmation may occur based on the first vehicle receiving a correction signal from the reference station, such as over the network 118, or based on the first vehicle being positioned in an area known to the first vehicle, such as via the transceiver 108b communication with the satellite 126, to be within the signal range of the reference station 116. For example, the first vehicle may confirm that a data correction solution, such as a real-time RTK data channel, is available to the first vehicle from the reference station 116.

In the block 204, the first vehicle receives a first set of correction data from the reference station, such as when the first vehicle is in the signal range of the reference station. This receipt may be wired, waveguide, or wireless, such as via the transceiver 108*a*. Note that the first vehicle is in positioning signal communication with the satellite 126, such as via the transceiver 108*b*.

In the block 206, the first vehicle generates, such as via the processor 104, a second set of correction data based on the first set of correction data. Such generation can include copying the first set of correction data to form the second set of correction data or analyzing the first set of correction data based on a set of positioning data sent from the satellite 126 to the transceiver 108*b* in order to locally determine the second set of correction data, which may augment the first set of correction data. For example, such determination can occur via a data correction logic, whether hardware or software, such as an RTK module, as known to skilled artisans, hosted via the first vehicle.

In the block 208, the first vehicle sends, such as via the transceiver 108*a*, the second set of correction data to a server, such as the server 114. Such sending may be wired, waveguide, or wireless, such as over the network 118.

In the block 210, the server 114 sends the second set of correction data to a second vehicle, such as the vehicle 120, which is positioned not in the signal range of the reference station, such as being outside of the signal range. Such sending can include broadcasting and can be over the network 118. For example, the first vehicle can forward the first set of data to the second vehicle out of range from the reference station, with the server used to implement this forwarding action. In this sense, the first set of data is repeated to the second vehicle that is out of range and cannot receive the first set of data directly. As such, a use range of the reference station is extended.

Figure 2B:
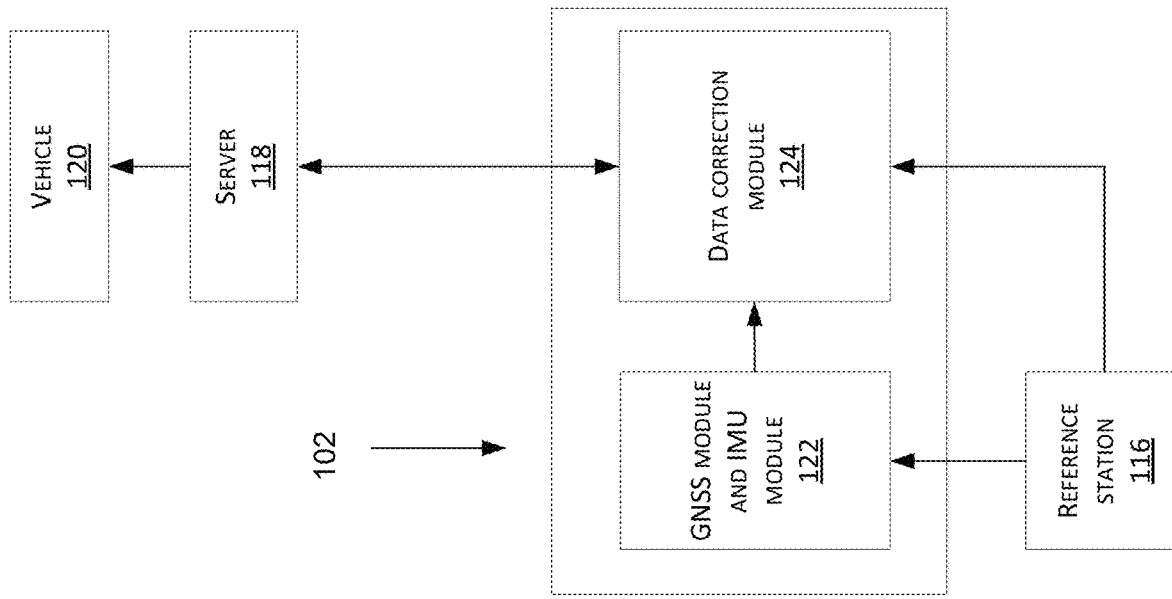
FIG. 2b shows a data flow diagram of an embodiment of a method for extending a range of a reference station according to this disclosure.

FIG. 2*b* shows a data flow diagram of a method for extending a range of a reference station according to this disclosure. A data flow diagram 200*b* depicts the vehicle 102 hosting a GNSS module and an inertial measurement unit (IMU) module as a single unit 122, although this configuration can vary such the based on the GNSS module and the IMU model being housed separately in different units.

The GNSS module, which can be hardware and/or software, is configured to receive data from the reference station 116, such as the first set of correction data, and from the satellite 126, such as the set of positioning data, as described in the blocks 202-204 of FIG. 2*a*. The IMU module, which can be hardware and/or software, is configured to measure and output a specific force and an angular rate of the vehicle 102. In hardware form, the IMU module can include an accelerometer, a gyroscope, and a magnetometer. The IMU module can enhance operation of the GNSS module, such as when the transceiver 108*b* is in communication with the satellite 126 when the vehicle 102 is not in line of sight of the satellite 126, such as in a tunnels, indoor garage, when electronic interference is present, or other scenarios, such as via a dead reckoning technique.

The vehicle 102 also hosts a data correction module 124, which can be hardware and/or software. The unit 122 sends the first set of correction data to the module 124. The module 124, such as an RTK module, analyzes the first set of data and the set of positioning data and then generates the second set of data, as described in the block 206 of FIG. 2*a*. In some embodiments, the data from the reference station 116 can be processed via the data correction module 124, whether additional to or alternative from the module 122. Such generation can include analyzing the first set of correction data based on the set of positioning data and then determining the second set of correction data via the data correction logic, as locally hosted, whether hardware or software or a combination of hardware and software. The data correction module 124 sends the second set of correction data to the server 118, which the sends, such as via broadcasting, the second set of correction data to the second vehicle, as described in the blocks 208-210 of FIG. 2*a*. As such, a use range of the reference station is extended.

FIG. 3 shows a flowchart of an embodiment of a method for using a vehicle as a reference station according to this disclosure. A method 300 includes a plurality of blocks 302-318, which are performed via the system 100.

In the block 302, a first vehicle, such as the vehicle 102, determines, such as via the processor 104, if the first vehicle is moving. Such determination can occur mechanically, electrically, or digitally. For example, mechanically, such determination can be based on the first vehicle having a transmission set to a park mode, or having an ignition key disengaged therefrom, or having a park brake activated, or having a wheel not rotating, or a drive axle not rotating, or any other mechanical way. Likewise, electrically, such determination can be based on a circuit of the first vehicle being open, where the circuit being closed relates to the first vehicle being not stationary or vice versa. For example, the circuit can be included in an electric motor of the first vehicle, an internal combustion engine of the first vehicle, a braking system of the first vehicle, a steering system of the first vehicle, an airbag system of the first vehicle, or any other system of the first vehicle having the circuit. Similarly, digitally, such determination can be based on a software component, such as a module, an object, a library, an application, an operating system, or others, running on the processor 104 such that the processor 104 can determine via request/response computing or polling a set of components of the first vehicle, whether hardware or software, that the first vehicle is not moving. Regardless, if the first vehicle is moving, then the block 304 is performed. Otherwise, if the first vehicle is not moving, then the block 306 is performed.

In the block 304, the first vehicle requests, such as via the processor 104, a set of correction data from a data source, such as the server 114 over the network 118 via the transceiver 108*a*, the reference station 116 over the network 118 via the transceiver 108*a*, or others.

In the block 306, the first vehicle estimates/accumulates, such as via the processor 104, a plurality of positioning measurements for the first vehicle over a time period. For example, the module 122 of FIG. 2*b* can facilitate this estimation/accumulation. Such estimation/accumulation can include the first vehicle generating a plurality of positioning measurements, which may include averaging the positioning measurements, over the period of time as the first vehicle is stationary, since positioning variance may be low, such as via a sigma methodology. The positioning measurements can be based on the first vehicle communicating via the transceiver 108*a* with the reference station 116 over the network 118 and via the transceiver 108*b* with the satellite 126. The period of time can be any time period. For example, the time period can be less than one day, less than twelve hours, less than six hours, less than three hours, less than one hour, less than thirty minutes, less than fifteen minutes, less than five minutes, or any other time period, inclusively. Note that longer time periods lead to more accurate positioning measurements or estimates. In some embodiments, the averaging is at least two minutes, as context appropriate.

In the block 308, the first vehicle determines, such as via the processor 104, whether an accurate location has been determined. For example, the module 124 of FIG. 2b can facilitate this determination. Such determination can allow the first vehicle to function as the reference station 116 and can include the first vehicle determining whether the positioning measurements, which may be averaged as a single value, such as an alphanumeric value stored in the memory 104 of the vehicle 102, satisfy a threshold, such as an alphanumeric value stored in the memory 104 of the vehicle 102. If the threshold is satisfied, whether above or below the threshold, then a set of location coordinates corresponding to the accurate location may be stored in the first vehicle, such as a set of alphanumeric values stored in the memory 104. Note that the threshold can be preset in advance, such as via programming or downloading from a remote data source, or can be determined dynamically, such as on-the-fly based on a set of criteria set in advance, such as via programming or downloading from a remote data source. If the accurate location has not been determined, then the block 306 is performed. Otherwise, if the accurate location has been determined, then the block 310 is performed.

In the block 310, the first vehicle determines, such as via the processor 104, a positioning correction based on the first vehicle based on the accurate location thereof. However, note that the positioning correction can be for any vehicle within a certain range, which may be predetermined in advance. For example, the module 124 of FIG. 2b can facilitate this determination. This determination may accommodate for an ionospheric impact to signals sent from the satellite 126 to the first vehicle.

In the block 312, the first vehicle sends, such as via the transceiver 108a, the positioning correction to a server, such as the server 114. Such sending may be wired, waveguide, or wireless, such as over the network 118. Note that the positioning correction may also include or be supplemented with a set of raw GNSS data, such as a set of raw GPS data, as obtained via the first vehicle, in order to allow for an effective accuracy determination.

In the block 314, the server locates, such as in a cellular manner or another manner as known to skilled artisans, a second vehicle, such as the vehicle 120, having a spatially and temporally correlated position to the first vehicle. For example, the server may locate based on discriminating a set of vehicles based on a factor, as preset in advance, such as via programming or downloading from a remote data source, or dynamically updated, such as on-the-fly, based on a set of criteria, as preset in advance, such as via programming or downloading from a remote data source. Such locating can include receiving the positioning correction, such as a set of correction data, from the first vehicle, as the first vehicle is stationary, and receiving a set of location data from the second vehicle, such as from the transceiver 108a over the network 118, where the set of location data is informative of a spatial and temporal position of the second vehicle at that time. The set of locating data can be formed based on the second vehicle communicating with the reference station 116, such as via the transceiver 108a, and with the satellite 126, such as via the transceiver 108b. Accordingly, the set of locating data can be used to generate a first value, such as an alphanumeric value, and a second value, such as an alphanumeric value, where the first value is a spatial value and the second value is a temporal value, and where the first value and the second value define a correlation dataset based on which the server locates the second vehicle with the spatially and temporally correlated position to the first vehicle. The first value is analyzed with the positioning correction to determine if the second vehicle is in spatial proximity to first vehicle. The second value is analyzed with the positioning correction to determine if the second vehicle is in temporal proximity to the first vehicle.

In the block 316, the server sends, such as via the networking unit over the network 118, a data correction to the second vehicle, with the second vehicle being spatially and temporally correlated to the first vehicle. The data correction includes the positioning correction.

In the block 318, the second vehicle, which is spatially and temporally correlated to the first vehicle, corrects, such as via the processor 104, its positioning measurement based on the data correction, as received from the server, such as via the transceiver 108a. Such correcting can include the second vehicle communicating with the reference station 116, such as via transceiver 108a, and with the satellite 126, such as via the transceiver 108b, and determining a position dataset based on such communication. Then, the second vehicle modifies the position dataset based on the data correction to accommodate for the data correction, such as via an RTK technique.

Figure 4A:
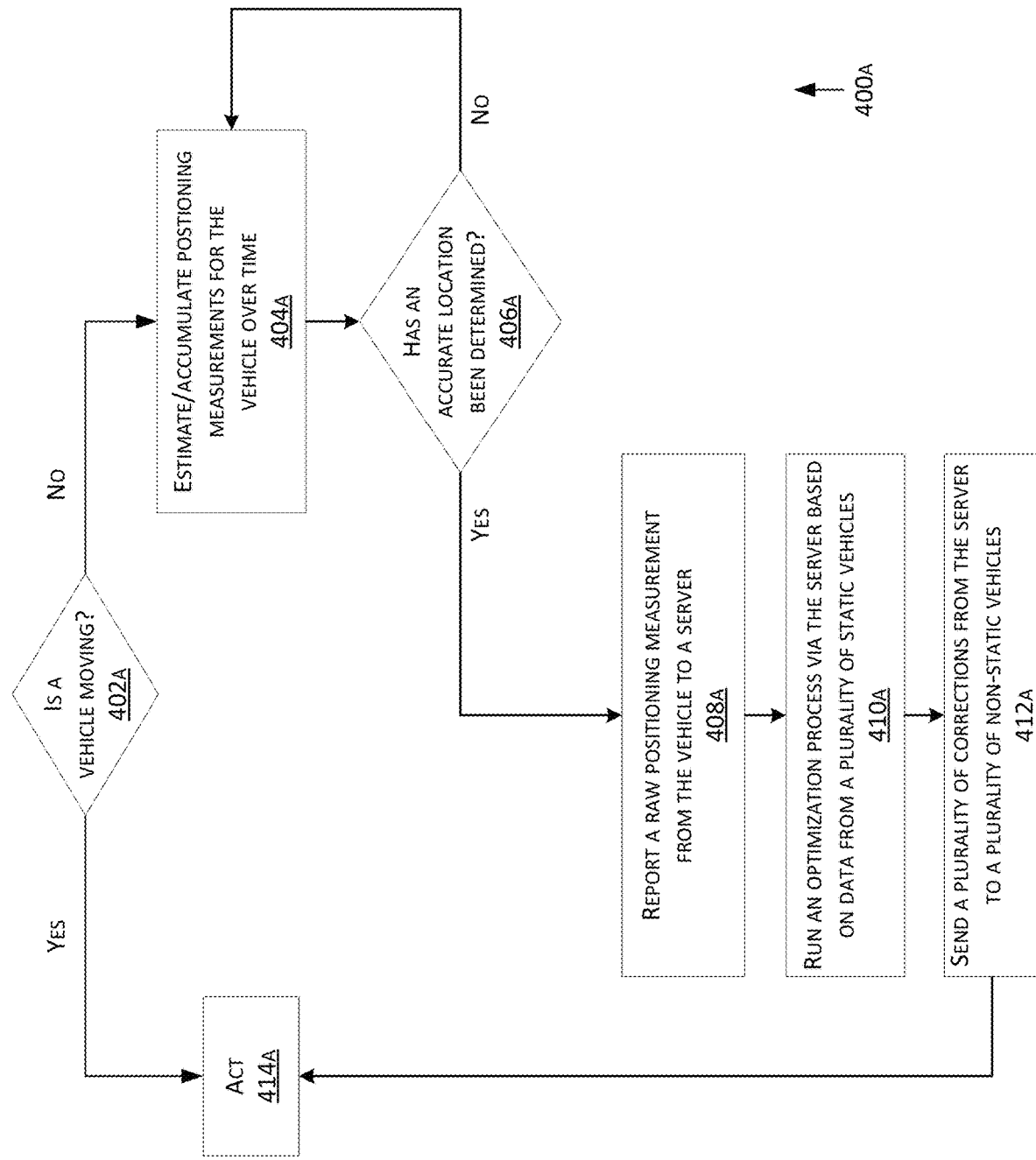
FIG. 4a shows a flowchart of an embodiment of a method for using a set of vehicles as a stationary cooperative reference station according to this disclosure.

FIG. 4a shows a flowchart of an embodiment of a method for using a set of vehicles as a stationary cooperative reference station according to this disclosure. A method 400a includes a plurality of blocks 402a-414a, which are performed via the system 100.

In the block 402a, a first vehicle, such as the vehicle 102, determines, such as via the processor 104, if the first vehicle is moving. Such determination can occur mechanically, electrically, or digitally. For example, mechanically, such determination can be based on the first vehicle having a transmission set to a park mode, or having an ignition key disengaged therefrom, or having a park brake activated, or having a wheel not rotating, or a drive axle not rotating, or any other mechanical way. Likewise, electrically, such determination can be based on a circuit of the first vehicle being open, where the circuit being closed relates to the first vehicle being not stationary or vice versa. For example, the circuit can be included in an electric motor of the first vehicle, an internal combustion engine of the first vehicle, a braking system of the first vehicle, a steering system of the first vehicle, an airbag system of the first vehicle, or any other system of the first vehicle having the circuit. Similarly, digitally, such determination can be based on a software component, such as a module, an object, a library, an application, an operating system, or others, running on the processor 104 such that the processor 104 can determine via request/response computing or polling a set of components of the first vehicle, whether hardware or software or both, that the first vehicle is not moving. Regardless, if the first vehicle is moving, then the block 414a is performed. Otherwise, if the first vehicle is not moving, then the block 404a is performed.

In the block 404a, the first vehicle estimates/accumulates, such as via the processor 104, a plurality of positioning measurements for the first vehicle over a time period. For example, the module 122 of FIG. 2b can facilitate this estimation/accumulation. Such estimation/accumulation can include the first vehicle generating a plurality of positioning measurements, which may include averaging the positioning measurements, over the period of time as the first vehicle is stationary, since positioning variance may be low, such as via a sigma methodology. For example, averaging the positioning measurements can be over such a period of time that an uncertainty of a position of the vehicle 102 is acceptable, possibly evidenced by a position variance dropping below a threshold, which may be statically or dynamically determined. The positioning measurements can be based on the first vehicle communicating via the transceiver 108a with the reference station 116 over the network 118 and via the transceiver 108b with the satellite 126. The period of time can be any time period. For example, the time period can be less than one day, less than twelve hours, less than six hours, less than three hours, less than one hour, less than thirty minutes, less than fifteen minutes, less than five minutes, or any other time period, inclusively. Note that longer time periods lead to more accurate positioning measurements or estimates. In some embodiments, the averaging is at least two minutes, as context appropriate.

In the block 406a, the first vehicle determines, such as via the processor 104, whether an accurate location has been determined. For example, the module 124 of FIG. 2b can facilitate this determination. Such determination can allow the first vehicle to function as the reference station 116 and can include the first vehicle determining whether the positioning measurements, which may be averaged as a single value, such as an alphanumeric value stored in the memory 104 of the vehicle 102, satisfy a threshold, such as an alphanumeric value stored in the memory 104 of the vehicle 102. If the threshold is satisfied, whether above or below the threshold, then a set of location coordinates corresponding to the accurate location may be stored in the first vehicle, such as a set of alphanumeric values stored in the memory 104. Note that the threshold can be preset in advance, such as via programming or downloading from a remote data source, or can be determined dynamically, such as on-the-fly based on a set of criteria set in advance, such as via programming or downloading from a remote data source. If the accurate location has not been determined, then the block 404a is performed. Otherwise, if the accurate location has been determined, then the block 408a is performed.

In the block 408a, the first vehicle reports, such as via the transceiver 108a, a raw positioning measurement to a server, such as the server 114. For example, the module 124 of FIG. 2b can facilitate this reporting. Such reporting can include generating, which may include averaging the positioning measurements, a raw positioning measurement corresponding to the accurate location, such as via the processor 104 and then sending the raw positioning measurement to the server. For example, the raw positioning measurement can include a set of alphanumeric values containing a longitude and a latitude of the accurate location, and potentially an altitude. Additionally or alternatively, the raw positioning measurement can include various measurements for an RTK technique, such as a carrier phase of an electromagnetic wave emanating from the satellite 126, as measured by the transceiver 108b, a Doppler shift of an electromagnetic carrier wave emanating from the satellite 126, as experienced by the transceiver 108b, a pseudo range measurement describing a distance between the antenna 110b and the satellite 126, a ratio of a carrier wave power to an electromagnetic noise power experienced by the transceiver 108b, or others, as known to skilled artisans. As such, any of such measurements can be reported via the first vehicle to the server. The generating may include a use of an RTK technique, as known to skilled artisans. The reporting can include sending via a wired, waveguide, or wireless manner, such as over the network 118. As such, the server receives a first raw positioning measurement from the first vehicle as the first vehicle is stationary In the block 410a, the server runs, whether in a local or distributed manner, an optimization process based on a plurality of datasets received from or corresponding to a plurality of static, such as non-moving, vehicles, including the first vehicle. For example, the datasets can be received over the network 118 and involve receiving a second raw positioning measurement from the second vehicle as the second vehicle is stationary. The optimization process can include or be based on a network RTK technique or augmented RTK technique, as known to skilled artisans, and involve the first raw positioning measurement and the second raw positioning measurement. For example, the optimization process can optimize for a variable based on multiple reference points that best fit a joint set of measurements, such as via curve fitting or any other manner known to skilled artisans, and determine a deviation therefrom, which may enable a determination of a positioning correction. As such, the server is enabled to fuse data sourced from multiple vehicles, such as the vehicle 102, communicating with multiple reference stations, such as the reference station 116, where such fusion enables a determination of a set of correction data.

In the block 412a, the server sends a plurality of positioning corrections to a plurality of non-static, such as moving, vehicles, such as the vehicle 120 or another vehicle, such as a third vehicle that is moving. The sending can include sending via a wired, waveguide, or wireless manner, such as over the network 118. The positioning corrections can be identical to or different from each other in content or format. The server generates or sources the positioning corrections based on the optimization technique, as per the block 410a. The server is aware of the vehicles being non-static based on the vehicles communicating with the server, such as via the transceiver 108a over the network 118, or via excluding the static cars from the block 410a, or as per the block 314 of FIG. 3.

In the block 414a, the first vehicle that moves takes an action of any type. For example, the first vehicle may determine, such as via the processor 104, a positioning correction for the first vehicle, such as via an RTK technique, as known to skilled artisans. For example, the action can include the vehicle consuming corrections data to improve its positioning accuracy, such as via receiving data and processing the data to improve its positioning accuracy, as disclosed herein. For example, the module 124 of FIG. 2b can facilitate this determination. Alternatively, the first vehicle may act as per the block 318 of FIG. 3. Alternatively, the first vehicle requests, such as via the processor 104, a set of correction data from a data source, such as the server 114 over the network 118 via the transceiver 108a, the reference station 116 over the network 118 via the transceiver 108a, or others.

Figure 4B:
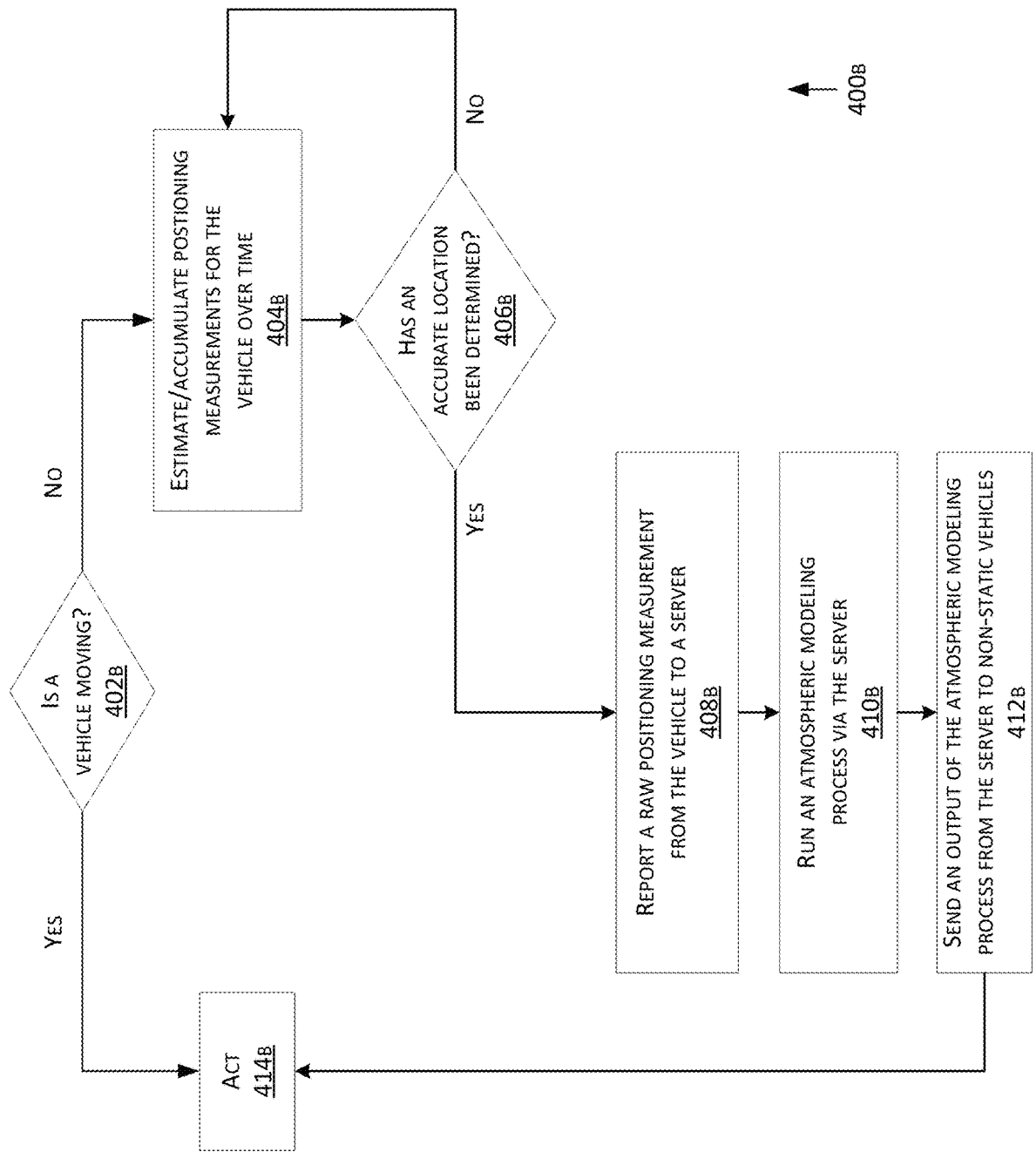
FIG. 4b shows a flowchart of an embodiment of a method for using a set of vehicles as a stationary cooperative reference station according to this disclosure.

FIG. 4b shows a flowchart of an embodiment of a method for using a set of vehicles as a stationary cooperative reference station according to this disclosure. A method 400b includes a plurality of blocks 402b-414b, which are performed via the system 100. Also, note that the except for the blocks 410b-412b, the processor 400a is similar to the process 400b. As such, only the blocks 410b-412b are described.

In the block 410b, the server runs, whether in a local or distributed manner, an atmospheric modeling process that generates an output based on a plurality of datasets received from or corresponding to a plurality of static, such as non-moving, vehicles, including the first vehicle. For example, the datasets can be received over the network 118 and involve receiving a second raw positioning measurement from the second vehicle as the second vehicle is stationary. For example, the atmospheric modeling process can entail modeling a temporal variation of an ionosphere in a network RTK environment or GPS ionospheric error correction models or an ionospheric time-delay algorithm for single frequency GPS users, as known to skilled artisans. For example, the atmospheric modeling process can involve the first raw positioning measurement and the second raw positioning measurement. As such, the server is enabled to fuse data sourced from multiple vehicles, such as the vehicle 102, communicating with multiple reference stations, such as the reference station 116, where such fusion enables a determination of a set of correction data, while accommodating for atmospheric conditions that may affect signal propagation from the satellite 126. Note that any atmospheric model, as known to skilled artisans, may be used, such as tropospheric, ionospheric, or others. Further, note that due to atmospheric conditions being fluid, the atmospheric modeling process may be periodically refreshed or updated to accommodate for such fluidity, such as less than twelve hours, inclusively.

In the block 412b, the server sends the output, which may include a plurality of positioning corrections, to a plurality of non-static, such as moving, vehicles, such as the vehicle 120 or another vehicle, such as a third vehicle that is moving. The sending can include sending via a wired, waveguide, or wireless manner, such as over the network 118. For example, the positioning corrections can be identical to or different from each other in content or format. The server generates or sources the positioning corrections based on the atmospheric modeling process, as per the block 410b. The server is aware of the vehicles being non-static based on the vehicles communicating with the server, such as via the transceiver 108a over the network 118, or via excluding the static cars from the block 410b, or as per the block 314 of FIG. 3.

In the block 414b, the first vehicle that moves takes an action of any type. For example, the first vehicle may determine, such as via the processor 104, a positioning correction for the first vehicle, such as via an RTK technique, as known to skilled artisans. For example, the action can include the vehicle consuming corrections data to improve its positioning accuracy, such as via receiving data and processing the data to improve its positioning accuracy, as disclosed herein. For example, the module 124 of FIG. 2b can facilitate this determination. Alternatively, the first vehicle may act as per the block 318 of FIG. 3. Alternatively, the first vehicle requests, such as via the processor 104, a set of correction data from a data source, such as the server 114 over the network 118 via the transceiver 108a, the reference station 116 over the network 118 via the transceiver 108a, or others.

Figure 5:
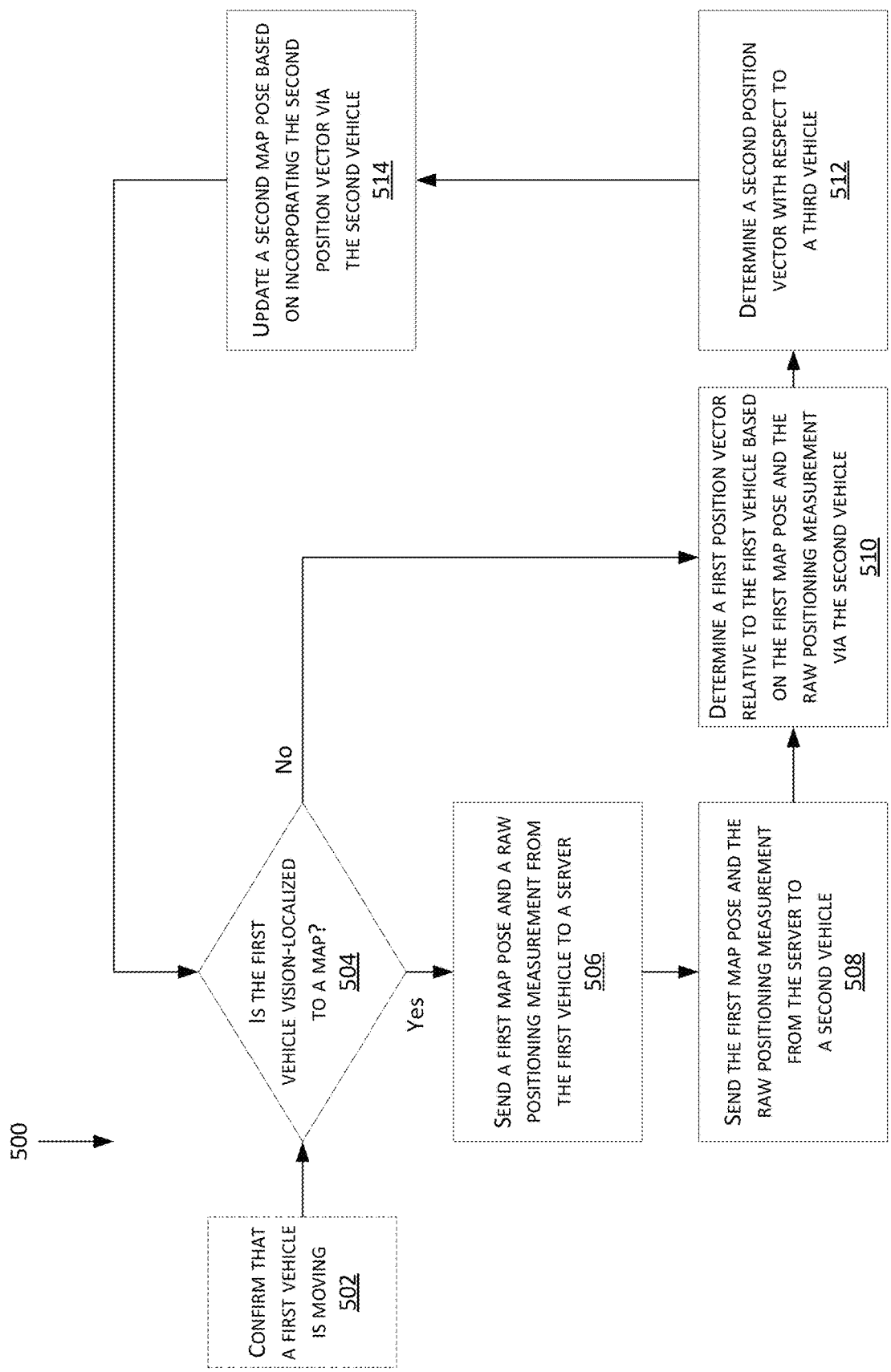
FIG. 5 shows a flowchart of an embodiment of a method for using a set of vehicles as a set of moving reference stations for map-relative localization according to this disclosure.

FIG. 5 shows a flowchart of an embodiment of a method for using a set of vehicles as a set of moving reference stations for map-relative localization according to this disclosure. A method 500 includes a plurality of blocks 502-514, which are performed via the system 100.

In the block 502, which is optional, a first vehicle, such as the vehicle 102, confirms, such as via the processor 104, that the first vehicle is moving. However, note that the confirmation might reverse, i.e., the first vehicle is stationary, as disclosed herein. Such confirmation may occur mechanically, electrically, or digitally. For example, mechanically, such determination can be based on the first vehicle having a transmission not set to a park mode, or not having an ignition key disengaged therefrom, or not having a park brake activated, or having a wheel rotating, or a drive axle rotating, or any other mechanical way. Likewise, electrically, such determination can be based on a circuit of the first vehicle being closed, where the circuit being open relates to the first vehicle being stationary or vice versa. For example, the circuit can be included in an electric motor of the first vehicle, an internal combustion engine of the first vehicle, a braking system of the first vehicle, a steering system of the first vehicle, an airbag system of the first vehicle, or any other system of the first vehicle having the circuit. Similarly, digitally, such determination can be based on a software component, such as a module, an object, a library, an application, an operating system, or others, running on the processor 104 such that the processor 104 can determine via request/response computing or polling a set of components of the first vehicle, whether hardware or software or a combination of both, that the first vehicle is moving.

In the block 504, the first vehicle determines, such as via the processor 104, whether the first vehicle is vision-localized to a map, such as via an input received from the camera 112, such as via an image sensor thereof. For example, as the first vehicle is moving, the camera 112 is powered to receive the input, whether still photos or videos, whether in 2D or 3D, depicting various objects, such as landmarks, sculptures, monuments, buildings, other vehicles, pedestrians, parks/nature, stadiums, lampposts, road signs, road corners, driveways, hydrants, overpasses, bridges, lane marks, lane width, lanes shape, manikins, store fronts, parking lots, or other visual reference points for which an exact location is known, such as via longitude, latitude, or altitude. This map pose may be useful in that the map pose may be accurate due to vision-based localization. The input is sent to the processor 104 for comparing, which may be in real-time, the input against a set of imagery containing a set of objects. The set of imagery may include still photos or videos, whether 2D or 3D, and may be locally stored, such as via the memory 106, or remotely stored, such as via the transceiver 108a communicating with the server 114 over the network 118. If the processor 104 identifies a visual match, such as via a pixel pattern, between the input and a member of the set of imagery, then the processor 104 extracts from the member or queries a data structure, such as an array, a hash, or others, for a set of coordinates, such as an X-axis, a Y-axis, and a Z-axis, corresponding to the member with respect to positioning on the map, whether the map is 2D, 3D, or any other type. The data structure may be locally stored, such as via the memory 106, or remotely stored, such as via the transceiver 108a communicating with the server 114 over the network 118. Once the processor 104 receives the set of coordinates, then the processor 104 may validate the set of coordinates against the map to ensure that the set of geographical coordinates are present on the map, which may be locally stored, such as via the memory 106, or remotely stored, such as via the transceiver 108a communicating with the server 114 over the network 118. Such validation can be bolstered via the vehicles also querying the reference station 116 via the transceiver 108a or the satellite 126 via the transceiver 108b. Note that since the vehicle is moving and the processor 104 is comparing the input against the set of imagery, the processor 104 may be a multicore processor or be a component in a multiprocessing environment, such as for parallel computing, which may be distributed, whether locally on the first vehicle, or with other vehicles or computing systems. As such, if the match is identified, then the block 506 is performed. Otherwise, if the match is not identified, then the block 508 is performed.

In the block 506, the first vehicle sends, such as via the transceiver 108a, a first map pose and a raw positioning measurement to a server, such as the server 114. For example, the module 124 in FIG. 2b can facilitate in such sending. The sending can include sending via a wired, waveguide, or wireless manner, such as over the network 118. The first map pose is based on the first vehicle being vision-localized to the map, as per the block 504. For example, the processor 104 can generate the first map pose to include a set of map coordinates locating the first vehicle on the map. The raw positioning measurement can be based on the first vehicle communicating with the reference station 116, such as via the transceiver 108a over the network 118, and the satellite 126, such as via the transceiver 108b. For example, the processor 104 can generate the raw positioning measurement to include a set of raw positioning coordinates.

In the block 508, the server sends the first map pose and the raw positioning measurement to a second vehicle, such as the vehicle 120. The sending can include sending via a wired, waveguide, or wireless manner, such as over the network 118. The server may discriminate among vehicles and send the first map pose and the raw positioning measurement to the second vehicle based on the second vehicle being positioned within a particular distance from the first vehicle, as determined via the server receiving positioning data from first vehicle and the second vehicle, such as over the network 118. The particular distance may be statically programmed or dynamically updateable, such as locally based on a set of criteria or via an downloaded update.

In the block 510, the second vehicle determines, such as via the processor 104, a first position vector relative to the first vehicle based on the first map pose and the raw positioning measurement, as known to skilled artisans, such as via an RTK technique, such as via the module 124 of FIG. 2b. This enables the second vehicle to determine an offset from the member of the set of imagery, such as a landmark or any other structure for which an exact location is known. For example, each vehicle, whether the first vehicle or the second vehicle, determines an update to its map pose on its own, after that vehicle receives the collective data about other cars in the area from the server. For example, with respect to determining the map pose and the raw positioning measurement, in order to calculate a relative vector, a pair of respective sets of data from both the first vehicle and second vehicle is used.

In the block 512, the second vehicle determines, such as via the processor 104, a second position vector with respect to a third vehicle, such as based on the third vehicle calculating this vector to the second vehicle based on receiving a set of data from the second vehicle. The second position vector may be determined based on the first map pose and the raw positioning measurement, as known to skilled artisans, or in any other manner, such as via an RTK technique, such as via the module 124 of FIG. 2b. For example, the second vehicle receives via the server is the raw positioning data and the map pose data about other cars in the area; then the first map pose is updated as a result of being able to determine the relative position vectors based on the collective position data broadcast by the server.

In the block 514, the second vehicle updates, such as via the processor 104, the first map pose to form a second map pose based on incorporating the second position vector such that the second map pose is more accurate than the first map pose. This updating may be in any manner, as known to skilled artisans, such as via an RTK technique, such as via the module 124 of FIG. 2b.

Note that the block 504 can be performed whether the first vehicle is moving or stationary, i.e., whether or not the first vehicle is localized to the map can occur whether the first vehicle is moving or stationary. This localization can be determined via a threshold, such as an alphanumeric value, an image, or others, stored in the memory 106. For example, for each vehicle in a plurality of vehicles, once this localization is determined based on satisfying the threshold, each of the vehicles sends their respective map poses and positioning measurements to the server and the server then accumulates these measurements from the vehicles. Once the server accumulates these measurements, the server broadcasts these measurements to a plurality of vehicles that are close to each other in a given area, whether or not those vehicles were part of the original plurality of vehicles. Each of the vehicles receiving these measurements, then uses these measurements to compute its relative position relative to all the other cars, and then uses that single result to update its own map pose. As such, the process 500 may not be so sequential as currently shown in FIG. 5 (e.g. car receives positioning info from one other car, then updates its map pose; then receives info from a second car, updates its map pose again). Rather, the vehicle can receive a plurality of measurements simultaneously and updates its map pose based on all of this collective data.

Figure 6:
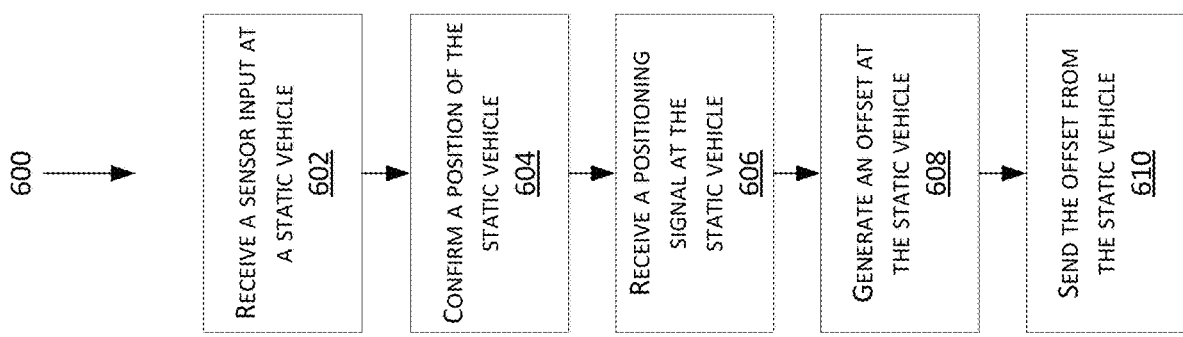
FIG. 6 shows a flowchart of an embodiment of a method for using a vehicle as a reference station according to this disclosure.

FIG. 6 shows a flowchart of an embodiment using a vehicle as a reference station according to this disclosure. A method 600 includes a plurality of blocks 602-610, which are performed via the system 100.

In the block 602, a static vehicle, such as the vehicle 102, receives, such as via the processor 104, a sensor input, such as via the camera 112. For example, the sensor input can include an image, whether a still photo or a sequence of images constituting a video. The sensor input could also be a sensing of a static reference such as known marker the position of which is known.

In the block 604, the static vehicle confirms, such as via the processor 104, a map-referenced position thereof based on the sensor input. For example, the processor 104 can process the sensor input, such as via an object recognition algorithm performed on the sensor input, and identify an object in the sensor input. Then, the processor 104 may query a data structure for a positioning dataset corresponding to the object. In some embodiments, the map-referenced position is distinct from a position based on a set of positioning signals, such as a set of GNSS signals, which is globally-referenced.

In the block 606, the static vehicle receives, such as via the processor 104, a positioning signal, such as via the transceiver 108b from the satellite 126. For example, the positioning signal can include a plurality of positioning signals, such as four or more positioning signals, from a plurality of satellites 126, such as four or more satellites 126.

In the block 608, the static vehicle generates, such as via the processor 104, an offset based on the map-referenced position, as confirmed per the block 604, and the positional signal, as per the block 606. For example, the processor 104 determines the offset based on a difference between a location associated with the positioning dataset and a location associated with the positioning signal.

In the block 610, the static vehicle sends, such as via the processor 104, the offset to a device, such as via the transceiver 108a. For example, the offset can be sent over the network 118 to a server, such as the server 114, or a vehicle, such as the vehicle 120.

Computer readable program instructions for carrying out operations of this disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, among others. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of this disclosure.

Aspects of this disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions. The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure.

The flowchart and block diagrams in the Figures illustrate the architecture, functionality, and operation of possible implementations of systems, methods, and computer program products according to various embodiments of this disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

Features or functionality described with respect to certain exemplary embodiments may be combined and sub-combined in and/or with various other exemplary embodiments. Also, different aspects and/or elements of exemplary embodiments, as disclosed herein, may be combined and sub-combined in a similar manner as well. Further, some exemplary embodiments, whether individually and/or collectively, may be components of a larger system, wherein other procedures may take precedence over and/or otherwise modify their application. Additionally, a number of steps may be required before, after, and/or concurrently with exemplary embodiments, as disclosed herein. Note that any and/or all methods and/or processes, at least as disclosed herein, can be at least partially performed via at least one entity or actor in any manner.

The terminology used herein can imply direct or indirect, full or partial, temporary or permanent, action or inaction. For example, when an element is referred to as being "on," "connected" or "coupled" to another element, then the element can be directly on, connected or coupled to the other element and/or intervening elements can be present, including indirect and/or direct variants. In contrast, when an element is referred to as being "directly connected" or "directly coupled" to another element, there are no intervening elements present.

Although the terms first, second, etc. can be used herein to describe various elements, components, regions, layers and/or sections, these elements, components, regions, layers and/or sections should not necessarily be limited by such terms. These terms are used to distinguish one element, component, region, layer or section from another element, component, region, layer or section. Thus, a first element, component, region, layer, or section discussed below could be termed a second element, component, region, layer, or section without departing from the teachings of this disclosure.

The terminology used herein is for describing particular exemplary embodiments and is not intended to be necessarily limiting of this disclosure. As used herein, the singular forms "a," "an" and "the" are intended to include the plural forms as well, unless the context clearly indicates otherwise. Also, as used herein, the term "a" and/or "an" shall mean "one or more," even though the phrase "one or more" is also used herein. The terms "comprises," "includes" and/or "comprising," "including" when used in this specification, specify the presence of stated features, integers, steps, operations, elements, and/or components, but do not preclude the presence and/or addition of one or more other features, integers, steps, operations, elements, components, and/or groups thereof. Furthermore, when this disclosure states herein that something is "based on" something else, then such statement refers to a basis which may be based on one or more other things as well. In other words, unless expressly indicated otherwise, as used herein "based on" inclusively means "based at least in part on" or "based at least partially on."

As used herein, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

Unless otherwise defined, all terms (including technical and scientific terms) used herein have the same meaning as commonly understood by one of ordinary skill in the art to which this disclosure belongs. The terms, such as those defined in commonly used dictionaries, should be interpreted as having a meaning that is consistent with their meaning in the context of the relevant art and should not be interpreted in an idealized and/or overly formal sense unless expressly so defined herein.

This detailed description has been presented for various purposes of illustration and description, but is not intended to be fully exhaustive and/or limited to this disclosure in various forms disclosed. Many modifications and variations in techniques and structures will be apparent to skilled artisans, without departing from a scope and spirit of this disclosure as set forth in various claims that follow. Accordingly, such modifications and variations are contemplated as being a part of this disclosure. A scope of this disclosure is defined by various claims, which include known equivalents and unforeseeable equivalents at a time of filing of this disclosure.

What is claimed is:

1. An apparatus for using a vehicle as a reference station, the apparatus comprising a vehicle including a processor and a memory, the processor being in communication with the memory, the memory storing a set of instructions and a threshold, and the set of instructions, when executed via the processor, causes the processor to:
   generate a plurality of positioning measurements of the vehicle's position over a period of time as the vehicle is stationary;
   determine whether variances in the positioning measurements satisfy the threshold;
   generate a set of correction data based on the positioning measurements and the threshold being satisfied; and
   send the set of correction data to a server.

2. The apparatus of claim 1, wherein the set of correction data is a first set of correction data, wherein the set of instructions causes the processor to request a second set of correction data from a data source as the vehicle is moving.

3. The apparatus of claim 2, wherein the data source includes the server.

4. The apparatus of claim 2, wherein the data source includes a reference station that is ground-based.

5. The apparatus of claim 4, wherein the reference station is stationary.

6. The apparatus of claim 1, wherein the set of instructions causes the processor to determine the threshold dynamically.

7. The apparatus of claim 1, wherein:
   the positioning measurements are a first positioning measurements,
   the period of time is a first period of time, and
   the set of instructions causes the processor to generate second positioning measurements over a second period of time based on the threshold not being satisfied.

8. The apparatus of claim 1, wherein the set of instructions causes the processor to generate the set of correction data via a differential GNSS technique.

* * * * *